US008607333B2

(12) United States Patent
Lee et al.

(10) Patent No.: US 8,607,333 B2
(45) Date of Patent: Dec. 10, 2013

(54) RADIO FREQUENCY IDENTIFICATION (RFID) SECURITY APPARATUS HAVING SECURITY FUNCTION AND METHOD THEREOF

(75) Inventors: Sang Yeoun Lee, Daejeon (KR); Heyung Sub Lee, Daejeon (KR); You Sung Kang, Daejeon (KR); Doo Ho Choi, Chungcheongnam-do (KR); Yong-Je Choi, Daejeon (KR); Hyunseok Kim, Daejeon (KR); Cheol Sig Pyo, Daejeon (KR); Jong-Suk Chae, Daejeon (KR); Dong-Beom Shin, Daejeon (KR); Jae-young Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 615 days.

(21) Appl. No.: 12/505,816

(22) Filed: Jul. 20, 2009

(65) Prior Publication Data

US 2010/0017617 A1    Jan. 21, 2010

(30) Foreign Application Priority Data

Jul. 21, 2008  (KR) ......................... 10-2008-0070869
Sep. 12, 2008  (KR) ......................... 10-2008-0090230

(51) Int. Cl.
*G06F 21/00* (2013.01)

(52) U.S. Cl.
USPC ............................................ 726/20; 713/185

(58) Field of Classification Search
USPC ........... 726/16, 20, 2; 713/182, 185, 168, 159
See application file for complete search history.

(56) References Cited

U.S. PATENT DOCUMENTS

| 2002/0048368 A1* | 4/2002 | Gardner .................. 380/277 |
| 2005/0204134 A1* | 9/2005 | Von Arx et al. ........... 713/168 |
| 2008/0170695 A1* | 7/2008 | Adler et al. ............... 380/277 |
| 2008/0196106 A1* | 8/2008 | Friedrich ................... 726/27 |
| 2009/0022310 A1* | 1/2009 | Robshaw ..................... 380/28 |
| 2009/0161872 A1* | 6/2009 | O'Brien et al. ........... 380/271 |

FOREIGN PATENT DOCUMENTS

| JP | 2008-305303 | 12/2008 |
| KR | 10-2004-0033159 A | 4/2004 |
| KR | 10-0651744 B1 | 11/2006 |
| KR | 10-2007-0059946 A | 6/2007 |
| KR | 10-0785810 B1 | 12/2007 |
| KR | 10-0738329 | 7/2009 |
| WO | 2006/015617 | 2/2006 |

OTHER PUBLICATIONS

Feldhofer et al., Strong Authentication for RFID Systems Using the AES Algorithm, 2004, pp. 357-370.*

* cited by examiner

*Primary Examiner* — Edward Zee
(74) *Attorney, Agent, or Firm* — Staas & Halsey LLP

(57) ABSTRACT

Disclosed are a radio frequency identification (RFID) security apparatus and a method thereof. According to the RFID security method, a secure tag reader performs determining an AES key using security information received from a secure tag and generating an output key using the determined AES key, decrypting AES data received from the secure tag using the output key, and encrypting data to be transmitted to the secure tag using the output key and transmitting the data, and a secure tag performs generating an output key using an AES key and security information, and transmitting the security information to a secure tag reader, encrypting data to be transmitted to the secure tag reader using the output key, and transmitting the encrypted data to the secure tag reader, and decrypting data received from the secure tag reader using the output key.

11 Claims, 20 Drawing Sheets

FIG. 1A

| BANK | CLASS | Addr | Word Addr | SUB-CLASS | REFERENCE VALUE | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|---|---|---|
| 00b | Reserved Area | 0 | 0 | Kill PWD | 0xDEAD | | | | | | | KILL PASSWORD [31:16] | | | | | | | | |
| | | 1 | 1 | | 0xCODE | | | | | | | KILL PASSWORD [15:0] | | | | | | | | |
| | | 2 | 2 | Access PWD | 0xACCE | | | | | | | ACCESS PASSWORD [31:16] | | | | | | | | |
| | | 3 | 3 | | 0xCODE | | | | | | | ACCESS PASSWORD [15:0] | | | | | | | | |
| | | 4 | 4 | MML | 0x0000 | RFU[7:0] = 0x00 | | | | | | | Minimum Mask Length Register [7:0] = 0x00 | | | | | | | | |
| | | 5 | 5 | Activation Code | 0x0000 | | | | | | | ACTIVATION CODE[95:80] | | | | | | | | |
| | | 6 | 6 | | 0x0000 | | | | | | | ACTIVATION CODE[79:64] | | | | | | | | |
| | | 7 | 7 | | 0x0000 | | | | | | | ACTIVATION CODE[63:48] | | | | | | | | |
| | | 8 | 8 | | 0x0000 | | | | | | | ACTIVATION CODE[47:32] | | | | | | | | |
| | | 9 | 9 | | 0x0000 | | | | | | | ACTIVATION CODE[31:16] | | | | | | | | |
| | | 10 | A | | 0x0000 | | | | | | | ACTIVATION CODE[15:0] | | | | | | | | |
| | | 11 | B | SecPC | 0x1600 | PC+EPC Length(00011) = 3 word | | | | | | | I=0 | | | 0 | AFI[7:0] = 0x00 | | | | |
| | | 12 | C | SecXPC | 0x3000 | RFU[8:0] = 0x00 | | | | | SP=1 | ST=1 | X=1 | U=1 | | BM=00 | 0 | 0 | Recommission[0:2] =000 | | |
| | | 13 | D | SecParam | 0x8300 | SF=1 | | | | RFU[3:0] = 0x0 | SA=0 | SS=0 | FS=0 | um Of Round[3:0] = 0x3(3 round) | | Key Index[7:0] = 0x00 | | | | | |
| | | 14 | E | AES Key | 0xAAAA | | | | | | | | | AES Key [127:112] | | | | | | | |
| | | 15 | F | | 0xAAAA | | | | | | | | | AES Key [111:96] | | | | | | | |
| | | 16 | 10 | | 0xAAAA | | | | | | | | | AES Key [95:80] | | | | | | | |
| | | 17 | 11 | | 0xAAAA | | | | | | | | | AES Key [79:64] | | | | | | | |
| | | 18 | 12 | | 0xAAAA | | | | | | | | | AES Key [63:48] | | | | | | | |
| | | 19 | 13 | | 0xAAAA | | | | | | | | | AES Key [47:32] | | | | | | | |
| | | 20 | 14 | | 0xAAAA | | | | | | | | | AES Key [31:16] | | | | | | | |
| | | 21 | 15 | | 0xAAAA | | | | | | | | | AES Key [15:0] | | | | | | | |

| BANK | CLASS | Addr | Word Addr | SUB-CLASS | REFERENCE VALUE | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|---|---|---|
| 01b | EPC Area | 0 | 0 | CRC | 0x0000 | | | | | | | | CRC16[15:0] | | | | | | | | |
| | | 1 | 1 | PC | 0x3600 | C Length(00000:1Word, 11111:32Word)=7 | | | | | U=1 | X=1 | I=0 | | | | AFI[7:0] = 0x00 | | | | |
| | | 2 | 2 | EPC (Max 16 Word) | 0xAAAA | | | | | | | | EPC[95:80] | | | | | | | | |
| | | 3 | 3 | | 0xAAAA | | | | | | | | EPC[79:64] | | | | | | | | |
| | | 4 | 4 | | 0xAAAA | | | | | | | | EPC[63:48] | | | | | | | | |
| | | 5 | 5 | | 0xAAAA | | | | | | | | EPC[47:32] | | | | | | | | |
| | | 6 | 6 | | 0xAAAA | | | | | | | | EPC[31:16] | | | | | | | | |
| | | 7 | 7 | | 0xAAAA | | | | | | | | EPC[15:0] | | | | | | | | |
| | | ... | ... | | 0xAAAA | | | | | | | | | | | | | | | | |
| | | 33 | 21 | XPC | 0x1000 | RFU[8:0]=0x00 | | | | | SP=0 | SS=0 | FS=0 | BM=00 | BT=0 | | 0 | 0 | Recommission[0:2] = 000 | | |

FIG. 1B

| | Reference Value | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| PC | 0x3600 | Word Length : 00110 (7 Word) | | | | | U(1) | X(1) | I(0) | NSI [8:F] 0x00 | | | | | | | |
| XPC | 0x1000 | RFU[0:1]:00 | | SP(0) | ST(1) | SA(0) | SS(0) | FS(0) | BM[0:1]=00 | BT(0) | | 000 | | | REC[0:2] = 000 | | |
| SecPC | 0x1600 | Word Length : 0001 0(3 Word) or 0100 1(10 Word) | | | | | U(1) | X(1) | I(0) | NSI [8:F] 0x00 | | | | | | | |
| SecXPC | 0x3000 | RFU[0:1]:00 | | SP(0) | ST(1) | SA(0) | SS(0) | FS(0) | BM[0:1]=00 | BT(0) | | 000 | | | REC[0:2] = 000 | | |
| SecParam | 0x0000 | SF | KS | RFU[0:1]:00 | | Round [0:3] : 0xN (N Round) | | | | RFU[0:1]:00 | | | | | | | |

FIG. 2

| SF | Round | |
|---|---|---|
| $0_2$ | $xxxx_2$ | NON (do not use data protection - operate in the same manner of conventional ISO/IEC 18000-6 Type C) |
| $1_2$ | $0001_2$ | 2AES-1OR-OFB: AES 1 round encryption method using OFB modes of operation |
| $1_2$ | $0010_2$ | 2AES-2OR-OFB: AES 2 round encryption method using OFB modes of operation |
| $1_2$ | $0011_2$ | 2AES-3OR-OFB: AES 3 round encryption method using OFB modes of operation |
| $1_2$ | $0100_2$ | 2AES-4OR-OFB: AES 4 round encryption method using OFB modes of operation |
| $1_2$ | $0101_2$ | 2AES-5OR-OFB: AES 5 round encryption method using OFB modes of operation |
| $1_2$ | $0110_2$ | 2AES-6OR-OFB: AES 6 round encryption method using OFB modes of operation |
| $1_2$ | $0111_2$ | 2AES-7OR-OFB: AES 7 round encryption method using OFB modes of operation |
| $1_2$ | $1000_2$ | 2AES-8OR-OFB: AES 8 round encryption method using OFB modes of operation |
| $1_2$ | $1001_2$ | 2AES-9OR-OFB: AES 9 round encryption method using OFB modes of operation |
| $1_2$ | $xxxx_2$ | 2AES-10OR-OFB: AES corresponding round encryption method using OFB modes of operation |

FIG. 4

-Sec_ReqRN Command (16+16+16+16 = 64bits)

| Command (0xE102) | Challenge 16 | RN16 | CRC16 |

-Sec_ReqRN Reply (16+16+16 = 48bits)

| Challenge | RN16 | CRC16 |

FIG. 5

-Update_Key Command (16+8+16+16+16 = 72 bits, Word Pointer(0x00 : SecParam)

| Command (0xE100) | Wordptr (0x00) | SecParam (SecParam + H_RN16) | RN16 | CRC16 |

-Update_Key Command (16+8+16+16+16 = 72 bits, Word Pointer(0x01 ~ 0x1F):AES Key(X))

| Command (0xE100) | Wordptr (0x0X) | AES Key (1/8 AES Key + H_RN16) | RN16 | CRC16 |

-Update_Key Finish Command (72 bits, Word Pointer(0x80):AES Key is Complete)

| Command (0xE100) | Wordptr (0x80) | CRC Checksum of AES (Checksum + H_RN16) | RN16 | CRC16 |

-Update_Key Finish Command (72 bits, Word Pointer(0x40):AES Key fails)

| Command (0xE100) | Wordptr (0x40) | (0xFF + H_RN16) | RN16 | CRC16 |

-Update_Key Reply (1+16+16 = 33 bits, Reply Time(T1) = within 20ms)

| Header | RN16 | CRC16 | bit position of word pointer (C:Complete, F : Fail)

| | 0 | 1 | 2 | 3 | 4 | 5 | 6 | 7 |
|---|---|---|---|---|---|---|---|---|
| WordPtr | C(0) | F(0) | Word Pointer of AES Key | | | | | |

Complete Finish (C:1, F:0)
- 4 bits mask and 4bits action are applied to SecParam and AES key.

| | 0 | 1 | 2 | 3 | 4 | 5 | 6 | 7 |
|---|---|---|---|---|---|---|---|---|
| WordPtr | 1 | 0 | 0 | 0 | Skip/write | Skip/write | Key read/write | Perma lock |
| | | | | | AES Key Mask | | AES Key Action | |

-0,x : Read/Update_Key (Open Secured State)
-1,x : Read/Update_Key (Only Secured State)

SecParam + AES Key

| SecParam |
| AES Key (1) |
| AES Key (2) |
| AES Key (3) |
| AES Key (4) |
| AES Key (5) |
| AES Key (6) |
| AES Key (7) |
| AES Key (8) |
| CRC Checksum |

SecParam (16 bits)

| SecParam |
| CRC Checksum |

FIG. 6

-Get_SecParam Command (16+16+16 = 48 bits)

| Command (0xE101) | RN16 | CRC16 |
|---|---|---|

-Get_SecParam Reply (1+16+16+16 = 49 bits)

| Header | SecParam | RN16 | CRC16 |
|---|---|---|---|

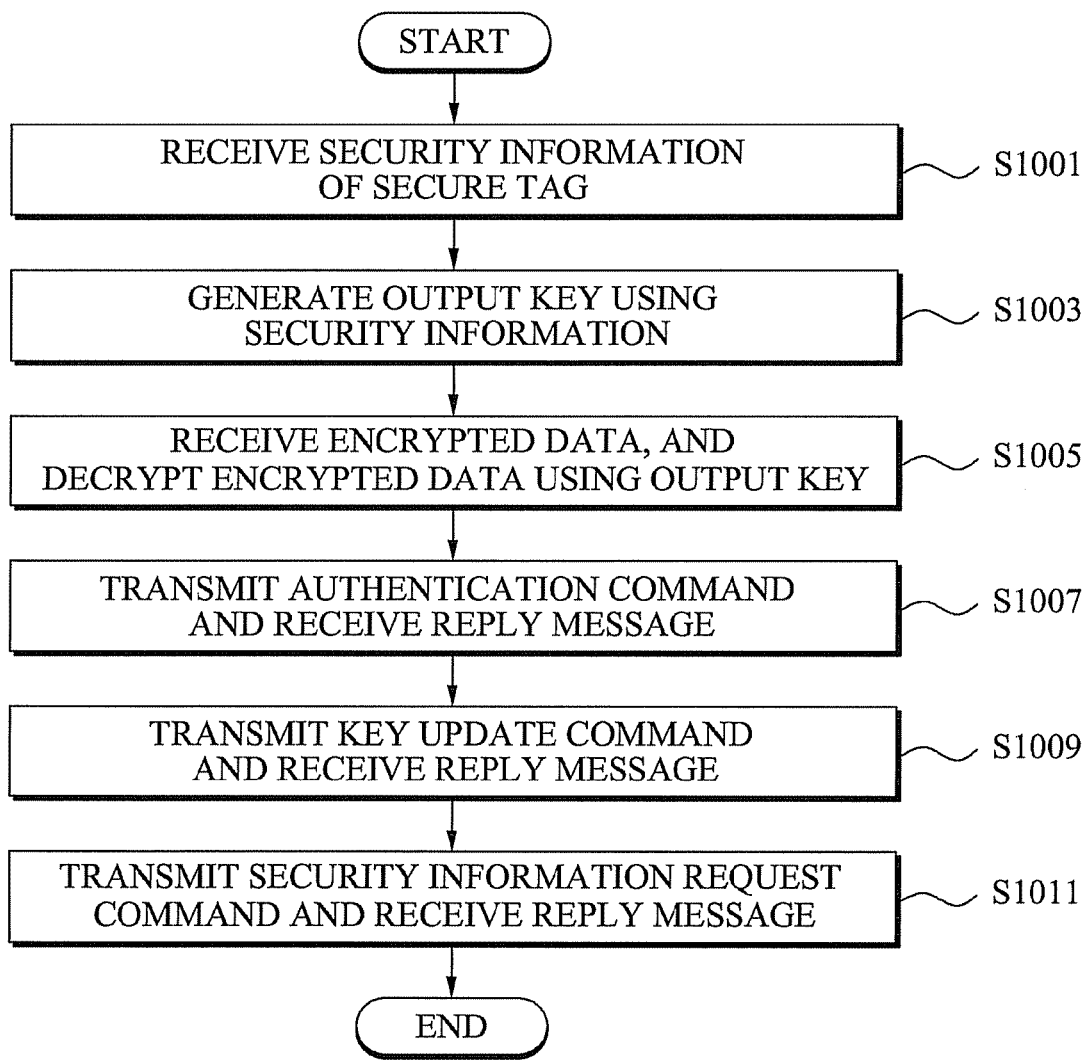

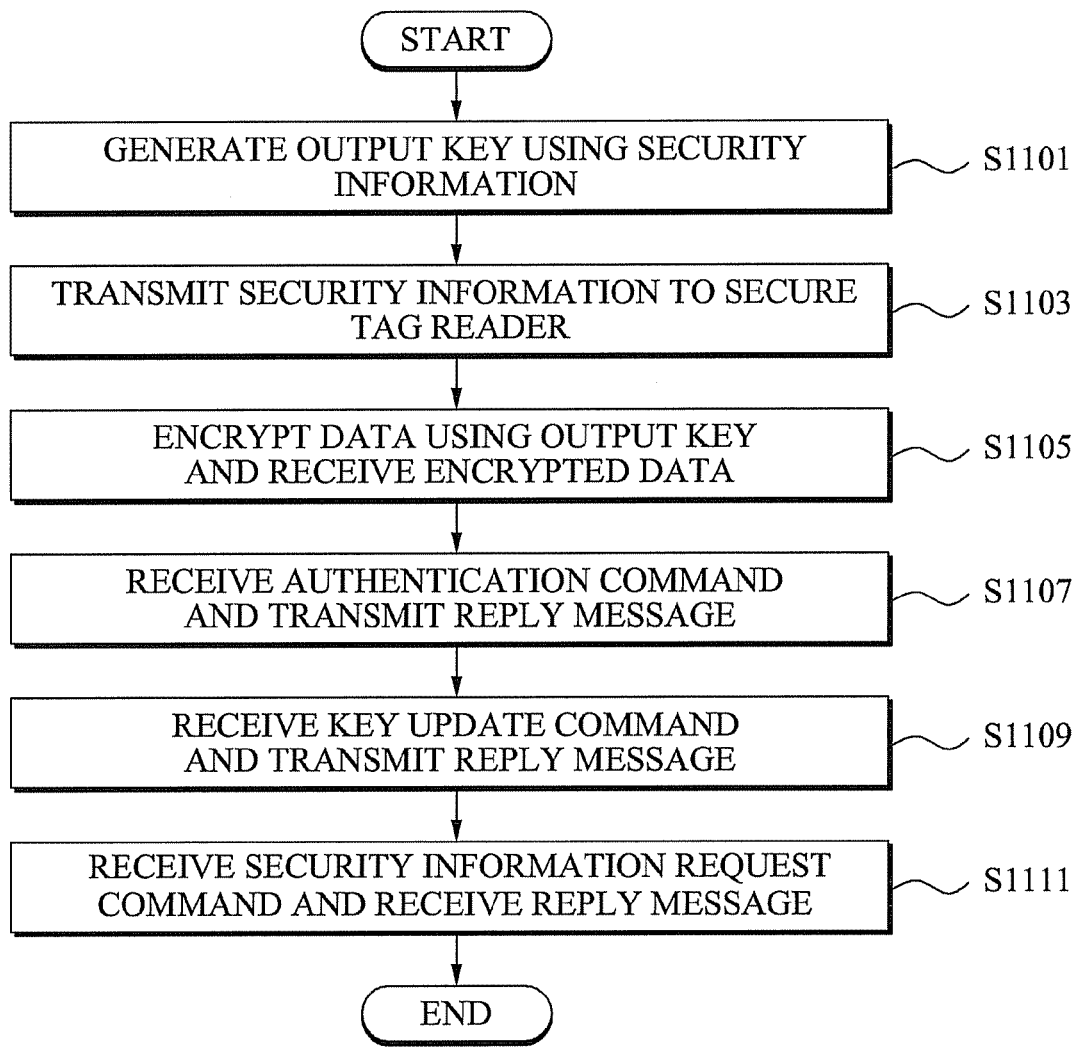

FIG. 13

| Preamble | PC | XPC | UII | CRC-16 |

FIG. 14

| Preamble | SecPC | SeeXPC | Secparam | Key-RN | CRC-16 |

RADIO FREQUENCY IDENTIFICATION (RFID) SECURITY APPARATUS HAVING SECURITY FUNCTION AND METHOD THEREOF

CROSS-REFERENCE TO RELATED APPLICATIONS

This application claims the benefit of Korean Patent Application Nos. 10-2008-0070869 and 10-2008-0090230, respectively filed on Jul. 21, 2008 and Sep. 12, 2008 in the Korean Intellectual Property Office, the disclosures of which are incorporated herein by reference.

BACKGROUND

1. Field

Example embodiments relate to a Radio Frequency Identification (RFID) security apparatus and a method thereof, and more particularly, to an RFID security apparatus having a security function and a method thereof.

2. Description of the Related Art

A conventional Radio Frequency Identification (RFID) apparatus may be used for commodity distribution management. The RFID apparatus may perform communication according to the International Organization for Standardization/International Electrotechnical Commission (ISO/IEC) 18000-6 protocol specification.

However, an RFID tag of the RFID apparatus has a possibility of being vulnerable to duplication and data leakage, and thus, the commodity distribution management using the RFID may not have stability. Accordingly, there is a need for a secure tag and secure tag reader that support data security.

SUMMARY

Example embodiments may provide a radio frequency identification (RFID) security apparatus that has security function using security information, thereby supporting data security.

According to example embodiments, there may be provided an RFID security apparatus, the apparatus including an output key generator to receive security information of a secure tag, to determine an advanced encryption standard (AES) key using the security information, and to generate an output key using the determined AES key, and at least one of an encryption unit to encrypt transmission data transmitted to the secure tag, and a decryption unit to decrypt encrypted reception data received from the secure tag.

According to example embodiments, there may be provided an RFID security method, wherein a secure tag reader may perform determining an AES key using security information received from a secure tag and generating an output key using the determined AES key, decrypting AES data received from the secure tag using the output key, and encrypting data to be transmitted to the secure tag using the output key and transmitting the data.

According to example embodiments, there may be provided an RFID security method, wherein a secure tag may perform generating an output key using an AES key and security information, and transmitting the security information to a secure tag reader, encrypting data to be transmitted to the secure tag reader using the output key, and transmitting the encrypted data to the secure tag reader, and decrypting data received from the secure tag reader using the output key.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which:

FIGS. 1A and 1B are diagrams illustrating a configuration of a secure memory included in a secure tag;

FIG. 2 is an encryption method according to setting of a security function (SF) and a round bit;

FIG. 4 is a diagram illustrating a secure req_RN command message and a reply message;

FIG. 5 is a diagram illustrating update key command messages and a reply message;

FIG. 6 is a diagram illustrating a Get SecParam command message and a reply message;

FIG. 10 is a flowchart illustrating an operational method of a secure tag reader of an RFID security apparatus having a security function according to example embodiments;

FIG. 11 is a flowchart illustrating an operational method of a secure tag of an RFID security apparatus having a security function according to example embodiments;

FIG. 13 is a diagram illustrating tag information of a general tag;

FIG. 14 is a diagram illustrating security information of a secure tag;

DETAILED DESCRIPTION

Figure 3:
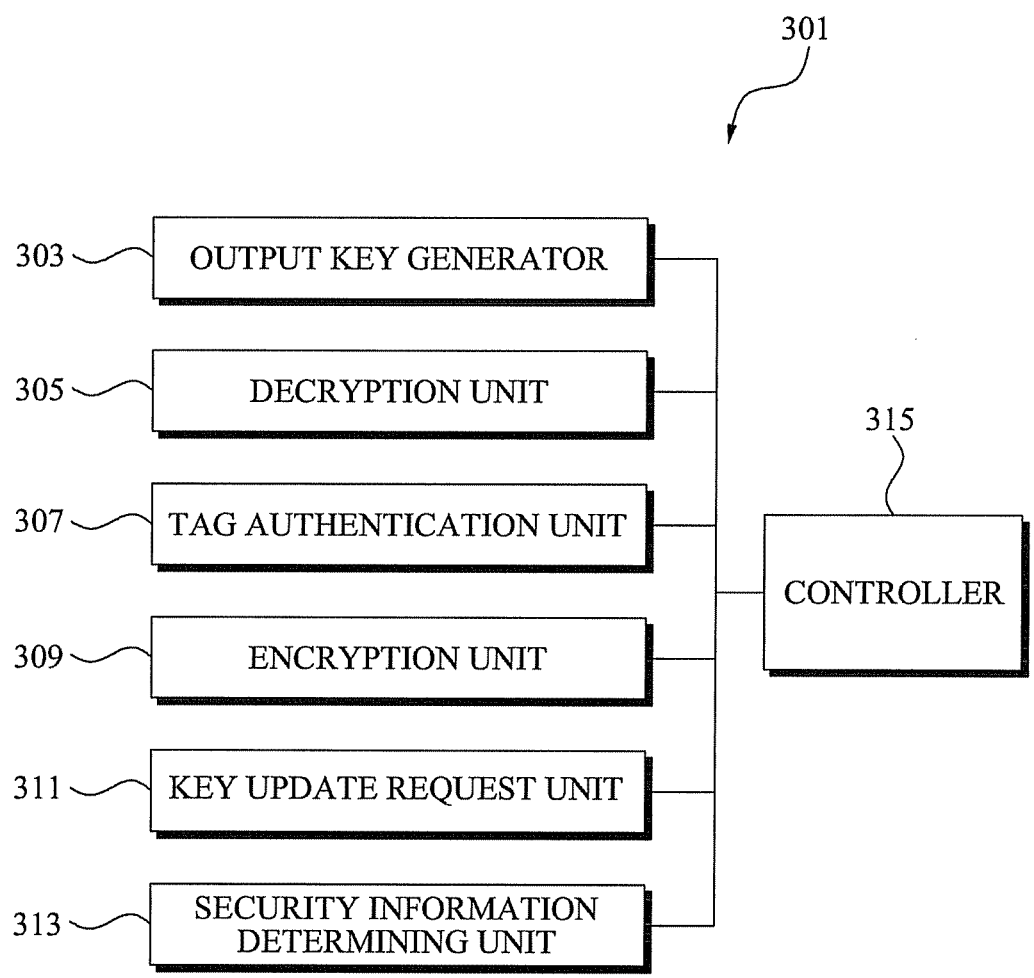
FIG. 3 is a block diagram illustrating a configuration of a secure tag reader of a Radio Frequency Identification (RFID) security apparatus having a security function according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

Hereinafter, according to example embodiments, a radio frequency identification (RFID) security apparatus having a security function and a method thereof will be described in detail.

The RFID security apparatus having the security function according to example embodiments may include a secure tag reader and a secure tag.

FIGS. 1A and 1B are diagrams illustrating a configuration of a secure memory included in a secure tag.

Here, the secure tag may be an RFID tag supporting the security function, and may include a secure memory of FIGS. 1A and 1B.

With reference to FIGS. 1A and 1B, an SecPC, an SecXPC, an SecParam and an Advanced Encryption Standard (AES) key, and the like are stored in the secure memory.

The SecPC and the SecXPC have an identical structure as a conventional PC and a conventional XPC and only a value of a predetermined bit is different, and thus, the SecPC and the SecXPC may be important for embodiment even without being stored in the secure memory.

The SecPC and the SecXPC respectively are protocol control (PC) and extended PC for transmitting an SecParam, and a Key_RN (input key (128 bits)).

When a secure parameter (SP) bit value of the XPC and a secure parameter bit value of the SecXPC are "1", it indicates that a corresponding message is the SecPC, the SecXPC, the SecParam, and the Key_RN (input key (128 bits)), and when the secure parameter bit value of the XPC and the secure parameter bit value of the SecXPC are "0", it indicates that the corresponding message is the PC, the XPC, and EPC.

Also, a secure tag bit of the XPC and a secure tag bit of the SecXPC indicate whether a corresponding tag supports the security function. When a secure tag bit value is "1", it indicates that the corresponding tag operates as a secure tag supporting the security function, and when the secure tag bit value is "0", it indicates that the corresponding tag merely operates as a general tag.

Also, when the secure tag receives a write command or a blockwrite command from the secure tag reader and changes a value of the PC or a value of the XPC, the secure tag reflects the changed value of the PC or the XPC to the SecPC and the SecXPC, thereby simultaneously changing the values. In particular, when [5:F] bit value of the PC is changed, the secure tag also changes [5:F] bit value of the SecPC, and when [0:1] bit value and [4:F] bit value of the XPC are changed, the secure tag also changes [0:1] bit value and [4:F] bit value of the SecXPC. Accordingly, to have correspondence between the SecPC and the SecXPC, and between the PC and the XPC, a separate command for changing a bit value is not required.

The SecParam is a memory area for transmitting an encryption method and information used in an encryption algorithm, and indicates a round number and an AES key index indicating where in the reader the AES key is stored, and the like.

The SecParam is constituted by a value (SP:Bit 00h (1 bit)) indicating whether the corresponding tag performs as the secure tag, an area reserved for future use (RFU:Bits 01h-3h (3 bits)), a value (Round:Bits 04h-07h (4 bits)) indicating an encryption method used between the tag and the reader, a key index value (Key index: Bits 08h-0Fh (8 bits)) including a key used between the tag and the reader.

When a security function (SF) bit value of the SecParam is "1", it indicates that a corresponding tag operates as the secure tag, and when the SF bit value of the SecParam is "0", it indicates that the corresponding tag operates as a passive RFID according to a conventional ISO/IEC 180006 protocol.

A round of the SecParam may be used for generating an output key (a session key). Here, a secure tag reader may adjust the round number according to a reaction time and operation power of the secure tag, and the like.

An encryption method of FIG. 2 may be provided according to setting of the SF and a round bit.

A key index of the SecParam may use $00000000_2 \sim 11111111_2$ and an RFU may use $000_2$ as default value.

The AES key is a private key for generating an output key used for data encryption, and the AES key is 128 bit data stored in address 14 through address 21 of the secure memory.

However, the secure memory may need to have a duplex structure to update the SecParam and the AES key. The duplex structure of the secure memory performs encryption based on an existing AES key and an existing SecParam and stores an updated AES key or an updated SecParam separately from the existing AES key and the existing SecParam until a new inventory round is started while the AES key and the SecParam are updated. Subsequently, when the new inventory round is started, the encryption is reflected by the updated new AES key and the updated SecParam.

FIG. 3 is a block diagram illustrating a configuration of a secure tag reader of an RFID security apparatus having a security function according to example embodiments.

With reference to FIG. 3, the secure tag reader 301 may include an output key generator 303, at least one of an encryption unit 305 and a decryption unit 309, a tag authentication unit 307, a key update request unit 311, a security information determining unit 313, and a controller 315.

The output key generator 303 receives security information of a secure tag, and determines an AES key using the security information.

The output key generator 303 recognizes whether data subsequent to XPC is the security information used for encryption, when a predetermined bit, namely an SP bit, of the XPC received from the secure tag is "1".

Here, the security information includes at least one of an SecXPC, an SecParam, and a Key_RN.

Also, the output key generator 303 generates an output key (session key) using the AES key, and transmits an acknowledge (ACK) response with respect to the security information to the secure tag. That is, the output key generator 303 may generate the output key (session key) using the AES key, the Key_RN (or 128 input key or public key), a round number, and the like. In this instance, the output key generator 303 may determine an AES key corresponding to a Key index in a database (not illustrated) using the key index of the SecParam.

The decryption unit 309 receives encrypted data, and decrypts encrypted data using the output key. Also, the encryption unit 305 may encrypt data to be transmitted to the secure tag. In particular, the decryption unit 309 performs exclusive OR (XOR) with respect to encrypted data and the output key to decrypt the encrypted data, and the encryption unit 305 performs XOR with respect to transmission data and the output key to encrypt the transmission data.

In this instance, the encryption method that performs XOR with respect to input data using the output key is performed in a same manner as the decryption method, and thus, the encryption unit 309 and the decryption unit 305 may be constructed in a same configuration.

FIG. 4 is a diagram illustrating a secure req_RN command message and a reply message.

The tag authentication unit 307 transmits predetermined challenge data to the secure tag using a Secure Req_RN command message of FIG. 4, and receives challenge reply data corresponding to the predetermined challenge data from the secure tag using a Secure Req_RN reply message.

The tag authentication unit 307 transmits challenge data encrypted using the encryption unit 309, and decrypts encrypted challenge reply data using the decryption unit 305.

The tag authentication unit 307 compares the predetermined challenge data with the decrypted challenge reply data to authenticate the secure tag. That is, the tag authentication unit 307 determines that the secure tag is not duplicated when the predetermined challenge data is identical to the decrypted challenge reply data. Conversely, the tag authentication unit 307 determines that the secure tag is duplicated when the certain challenge data is not identical to the decrypted challenge reply data.

FIG. 5 is a diagram illustrating update key command messages and a reply message.

The key update request unit 311 generates a new AES key different from the existing AES key, and transmits the new AES key using an update key command message of FIG. 5.

FIG. 6 is a diagram illustrating an update key command messages and a reply message.

The security information determining unit 313s transmits a Get SecParam command message of FIG. 6 and receives a Get SecParam reply message as a response thereto, thereby determining whether the SecParam is normally set.

The controller 315 generally controls the secure tag reader.

Figure 7:
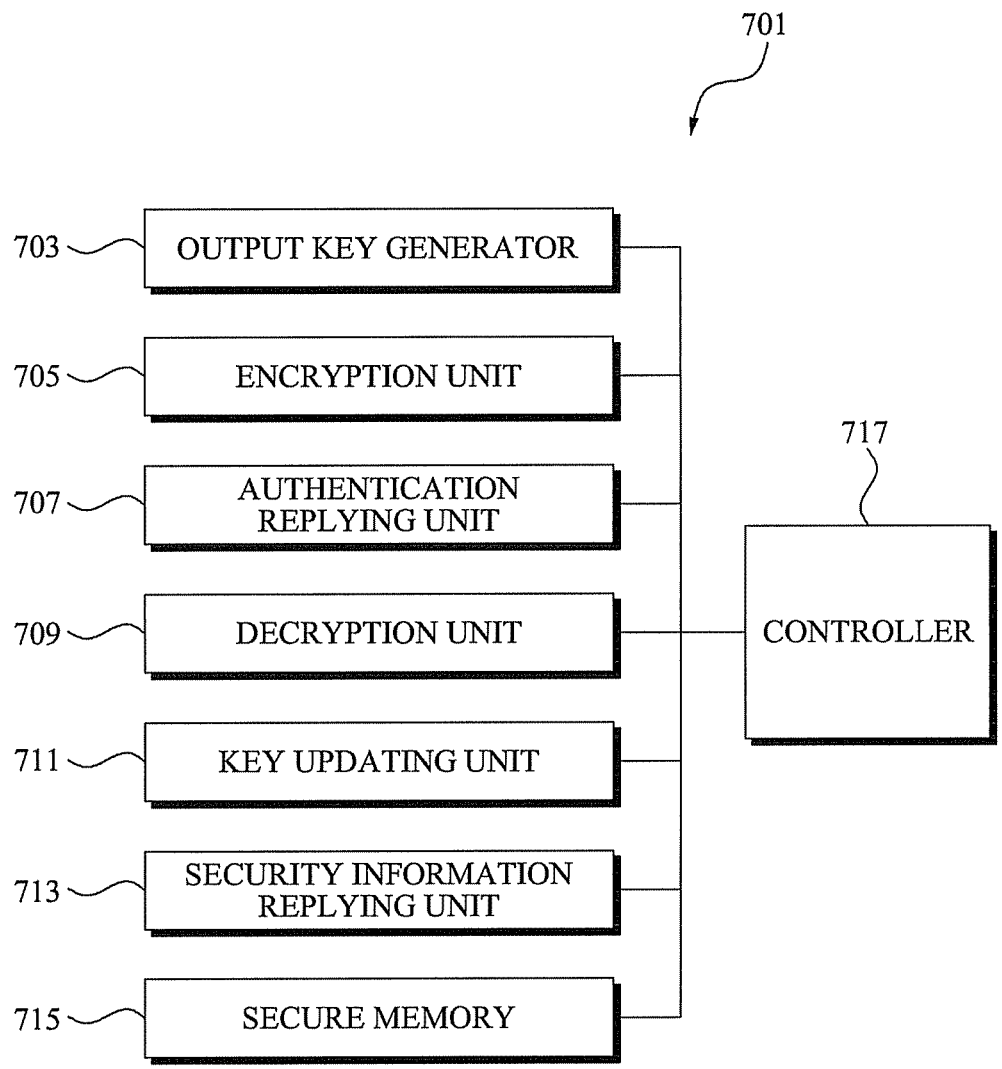
FIG. 7 is a block diagram illustrating a configuration of a secure tag of an RFID security apparatus having a security function according to example embodiments.

FIG. 7 is a block diagram illustrating a configuration of a secure tag of an RFID security apparatus having a security function according to example embodiments.

With reference to FIG. 7, the secure tag 701 may include an output key generator 703, at least one of an encryption unit 705 and a decryption unit 709, an authentication replying unit 707, a key updating unit 711, a security information replying unit 713, a secure memory 715, and a controller 717.

The output key generator 703 generates an output key using an AES key, and transmits security information to a secure tag reader. Here, the AES key and the security information may be set in advance in the secure memory 715 of the secure tag 701.

In particular, the output key generator 703 generates a Key_RN (16 bits) for generating an input key (public key (128 bits)) when a select message is received from the secure tag reader. Here, the input key is generated in advance based on process capability of the secure tag. In this instance, since the used tag is the secure tag, an SF bit of the SecParam is "1". The output key generator 703 generates the input key (public key (128 bits)) using the Key_RN and generates the output key using the AES key and a round number which are stored in a memory together with the generated input key (public key).

The encryption unit 705 encrypts data using the output key, and transmits encrypted data to the secure tag reader. Also, the decryption unit 709 decrypts the encrypted data received from the secure tag reader.

As an example, the encryption unit 705 may perform XOR with respect to data of the secure memory 715 and the output key to encrypt the data, and the decryption unit 709 may perform XOR with respect to encrypted data received from the secure tag reader and the output key to decrypt the data.

When predetermined challenge data is received from the secure tag reader, the authentication replying unit 707 transmits, to the secure tag reader, challenge reply data corresponding to the predetermined challenge data.

That is, the authentication replying unit 707 decrypts the encrypted challenge data using the decryption unit 709, and re-encrypts the decrypted challenge data using the encryption unit 705. Subsequently, the authentication replying unit 707 may transmit the re-encrypted challenge reply data to the secure tag reader.

When receiving an update key command message including a new AES key from the secure tag reader, the key updating unit 711 stores the new AES key to be updated in the secure memory 715. The key updating unit 711 receives a plurality of packets including parts of the new AES key from the secure tag reader, and stores the new AES key in the secure memory when a value obtained by performing cyclic redundancy checks (CRCs) respectively included in the packets and a CRC checksum with respect to the new AES key received from the secure tag reader are identical.

When receiving a Get SecParam command message from the secure tag reader, the security information replying unit 713 transmits a Get SecParam reply message including a newly set SecParam to the reader.

The controller 717 generally controls the secure tag.

Figure 8:
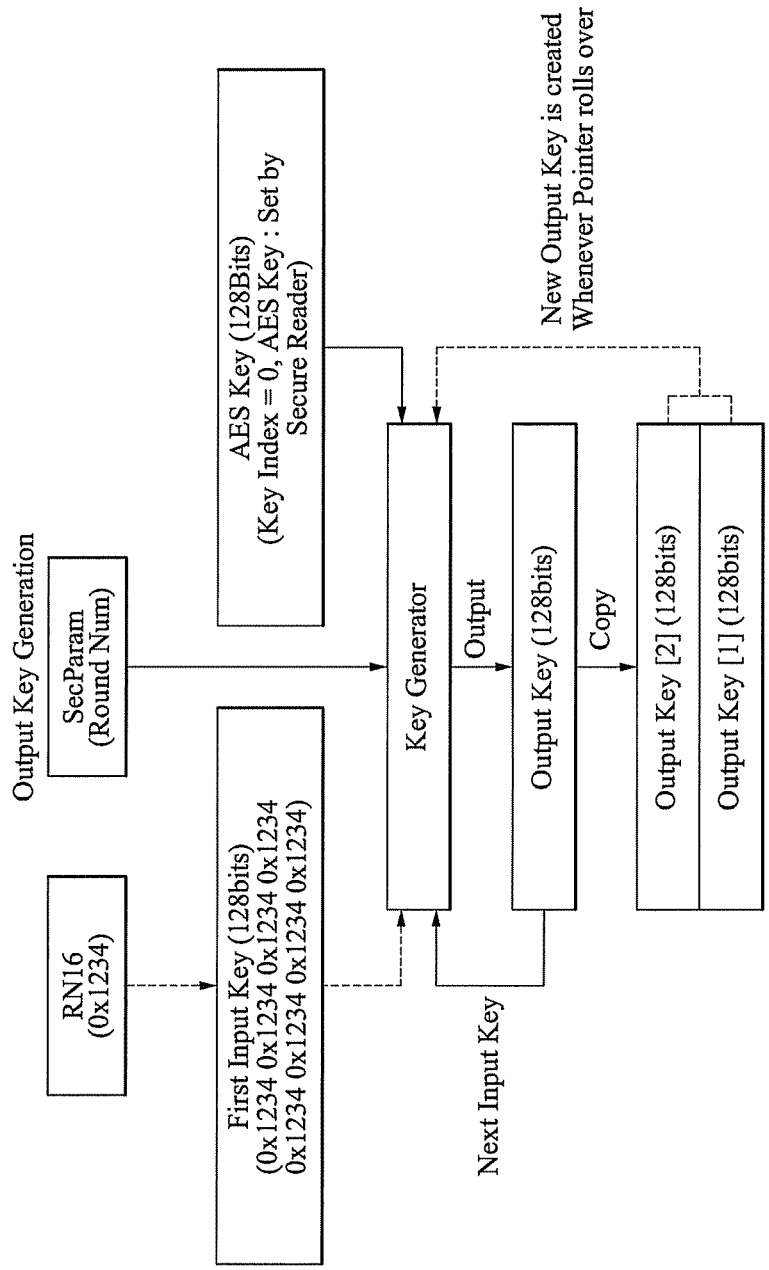
FIG. 8 is a diagram illustrating an output key generating method of a key generator in an RFID security apparatus having a security function according to example embodiments.

FIG. 8 is a diagram illustrating an output key generating method of a key generator in an RFID security apparatus having a security function according to example embodiments.

With reference to FIG. 8, the key generator generates an output key using a first input key (public key), an AES key, and a round number of SecParam.

Here, the first input key (public key) may be 128 bit data generated by repeating a randomly generated Key_RN (16 bits), when a secure tag having "1" as an SF bit receives a select command. Also, the first input key (public key) may be 128 bit data which is randomly generated.

The AES key is a private key that is determined between a secure tag reader and the secure tag.

The key generator receives inputs of the AES key, a round number, and the first input key (public key), and generates at least two output keys in advance to enable the secure tag to smoothly operate during the generation of the output key. In this instance, the output key may be used as an input key used for generating a next output key.

Figure 9:
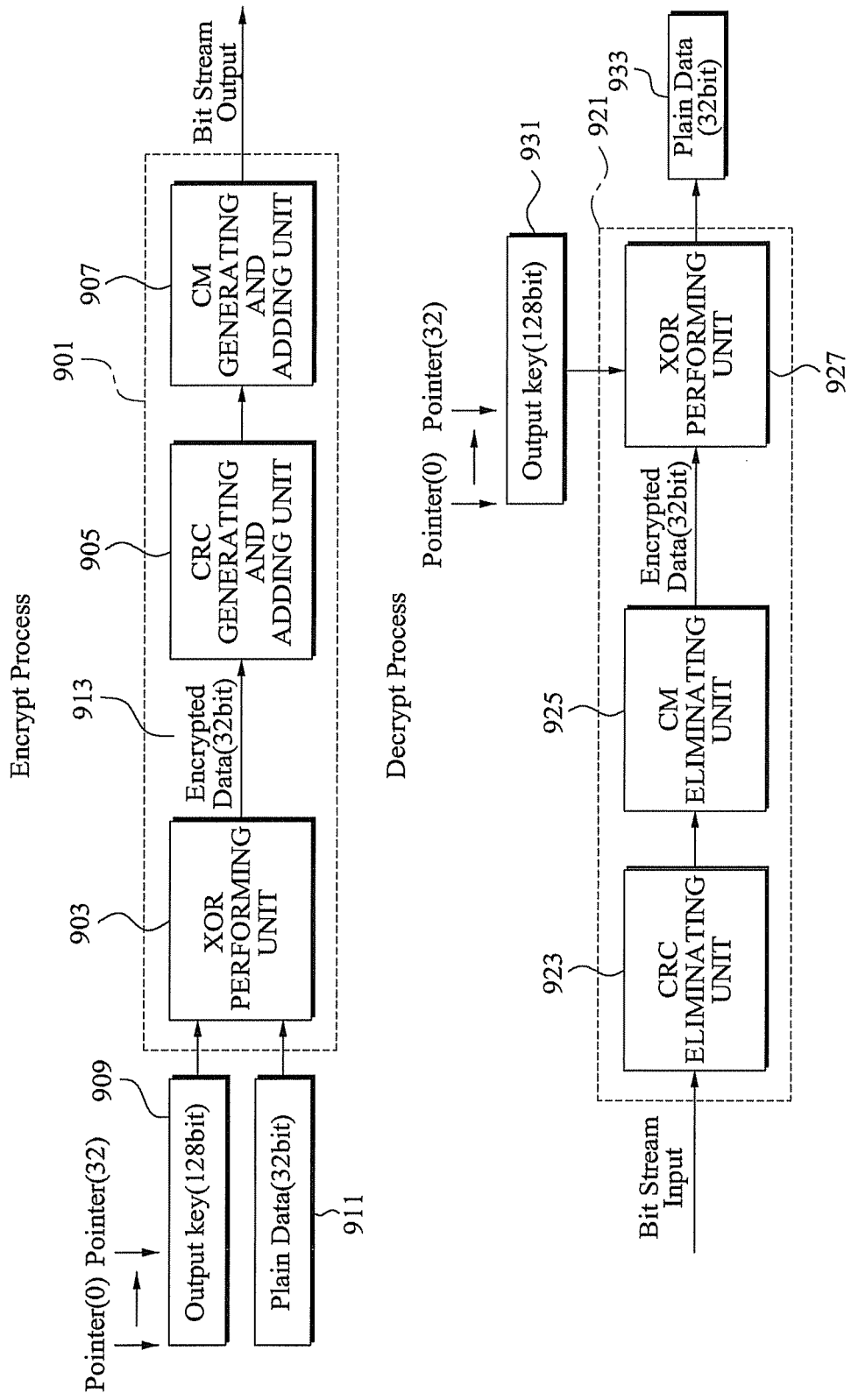
FIG. 9 is a block diagram illustrating a configuration of an encryption/decryption unit of an RFID security apparatus having a security function according to example embodiments.

FIG. 9 is a block diagram illustrating a configuration of an encryption unit 901 and a decryption unit 921 of an RFID security apparatus having a security function according to example embodiments.

With reference to FIG. 9, the encryption unit 901 may include an XOR performing unit 903, a CRC generating and adding unit 905, and a command (CM) generating and adding unit 907.

The XOR performing unit 903 receives an output key 909 and data 911 to be encrypted, and performs XOR with respect to the output key 909 and the data 911 to be encrypted by a bit unit to generate encrypted data 913.

The CRC generating and adding unit 905 generates a CRC, and adds the CRC to the encrypted data 913.

The CM generating and adding unit 907 generates a CM, and adds the CM to an output data of the CRC generating and adding unit 905 to output a bit stream where the CRC and the CM are added.

The decryption unit 921 may include a CRC eliminating unit 923, a CM eliminating unit 925, and an XOR performing unit 927.

The CRC eliminating unit 923 receives the bit stream and eliminates the CRC of the bit stream.

The CM eliminating unit 925 eliminates the CM from the bit stream where the CRC is eliminated.

The XOR performing unit 927 receives the output data of the CM eliminating unit 925, namely the encrypted data 929 and an output key 931, and performs XOR with respect to the encrypted data 929 and the output key 931 to generate plain data 933.

When performing encryption and decryption in an inventory round, the encryption unit 901 and the decryption unit 921 always maintain a bit position of a current output key 909 or 931 and process data. The encryption unit 901 and the decryption unit 921 perform XOR with respect to data by a bit unit, from the current bit position, whenever the data is transmitted/received, and the bit position increases by a number of XORs performed. Also, when encrypting or decrypting the data, a corresponding command and a CRC 16 are excluded. Accordingly, a structure of the encryption unit 901 and a structure of the decryption unit 921 may not be limited thereto, and the encryption unit 901 and the decryption unit 921 may only include the XOR performing unit.

Hereinafter, an update key command message used for setting SecParam of the secure tag and AES key will be described in detail.

The update key command message is a message for updating an AES key (private key) value of a secure memory, an update_key finish command message is a message indicating success or failure of the AES key, and an update_key reply message is a reply message with respect to the update_key command message or the update_key finish command message.

Referring to FIG. 5, the update key command message is a message for updating the AES key (private key) value of the secure memory, and may include a code value, a word pointer, a SecParam or an AES key, an RN16, and a CRC16.

The code value of the update key command may use "0xE100 (11100001 00000000)".

The word pointer of the update key command message generally indicates a transmission sequence of AES keys, and as an example, when the word pointer is "0x80, C='1'", it is a command for the secure tag to store a received AES key in the secure memory since the transmission is successful. When the transmission is successful, lower four bits of the word pointer may be used as an action bit and a mask of a password which is applied to the SecParam and the AES key. The password is applied based on a method described in the ISO/IEC 18000-6 protocol specification. Also, a corresponding field may be corrected only through the update key command message instead of a write command message or a blockwrite command message. Also, when the word pointer of the update key command message is "0x40, F='1'", it is a command for the secure tag to delete the received AES key (private key) since performance of the update key fails due to an error.

Whether the error occurs is determined based on a header of the update_key reply message. That is, when the header of the update_key reply message is "1", it indicates that an error occurs, and examples of the error are as below.

First, when the header of the update_key reply message with respect to the update key command message is set to "1", the word pointer may have an incorrect value. As an example, a current value of the AES key is 8 words (128 bits) and the word pointer may be greater than 8 words.

Second, when a header of a update_key reply message with respect to the update_key finish command message is set to "1", a CRC of the AES key (private key) received from the secure tag may not be identical to a CRC checksum of the AES key received by the update_key finish command. In this instance, the secure tag reader newly starts update key transmission immediately, or in a next inventory round.

Referring to the operation of updating the AES key (private key) value using the update key command message between the secure tag reader and the secure tag, the secure tag reader sequentially transmits a SecParam, AES keys 1 through 8, and a CRC checksum. Also, the secure tag reader transmits only the SecParam and the CRC checksum when not transmitting the AES keys.

If a CRC error occurs when the SecParam and the AES keys 1 through 8 are received, the secure tag disregards a corresponding command.

When an RFID tag does not reply before a T1 timer expires, the secure tag reader may initialize an update key process or re-perform a process of updating an AES key (private key) in a new inventory round. Also, when the secure tag reader transmits the AES key using an update_key command message and receives update_key reply message in which a header is "1", the secure tag reader may attempt retransmission of the corresponding AES key (x).

Also, when a CRC checksum value of the CRC checksum received from the secure tag reader is identical to a CRC value obtained by operating with respect to the SecParam and the AES key 1 through 8 in the secure tag, the secure tag performs key update and transmits a successful reply. Conversely, when the CRC check value is not identical to the CRC value, the secure tag transmits a failure reply.

The secure tag reader may initialize the update key process or may re-perform updating of the AES key in a new inventory round when receiving the failure reply from the secure tag. Here, the CRC operation method is based on a method described in the ISO/IEC 18000-6 protocol specification.

According to an example embodiment, the RFID security apparatus uses an AES key and security information, thereby supporting security of communication data between the secure tag reader and the secure tag. Accordingly, the RFID security apparatus controls accessing of the secure tag, thereby preventing duplication of the secure tag and providing confidentiality of data. Therefore, stability increases when the secure tag is utilized.

Figure 12A:
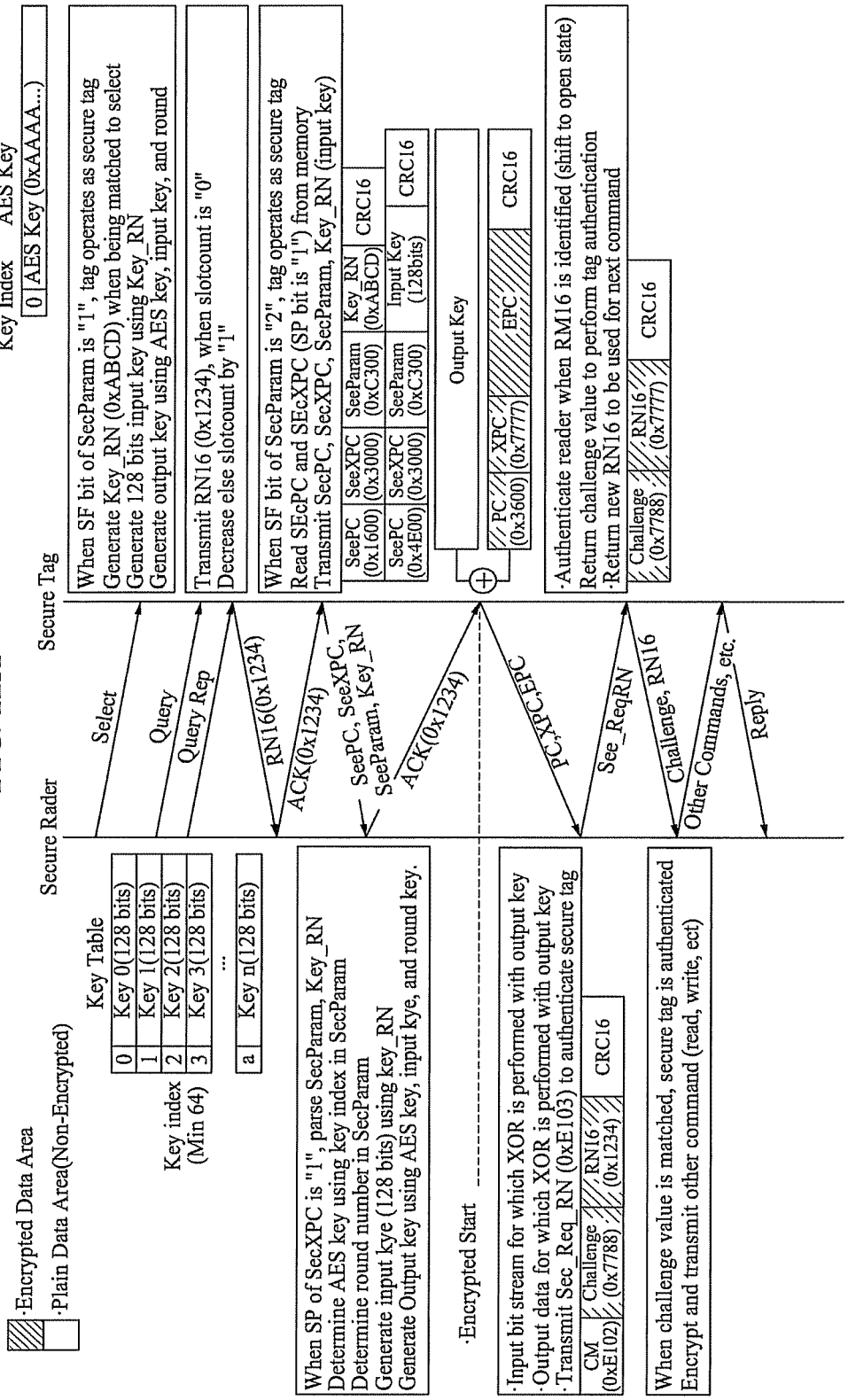
FIGS. 12A, 12B and 12C are flowcharts illustrating a communication procedure between a secure tag reader and a secure tag.
Figure 12B:
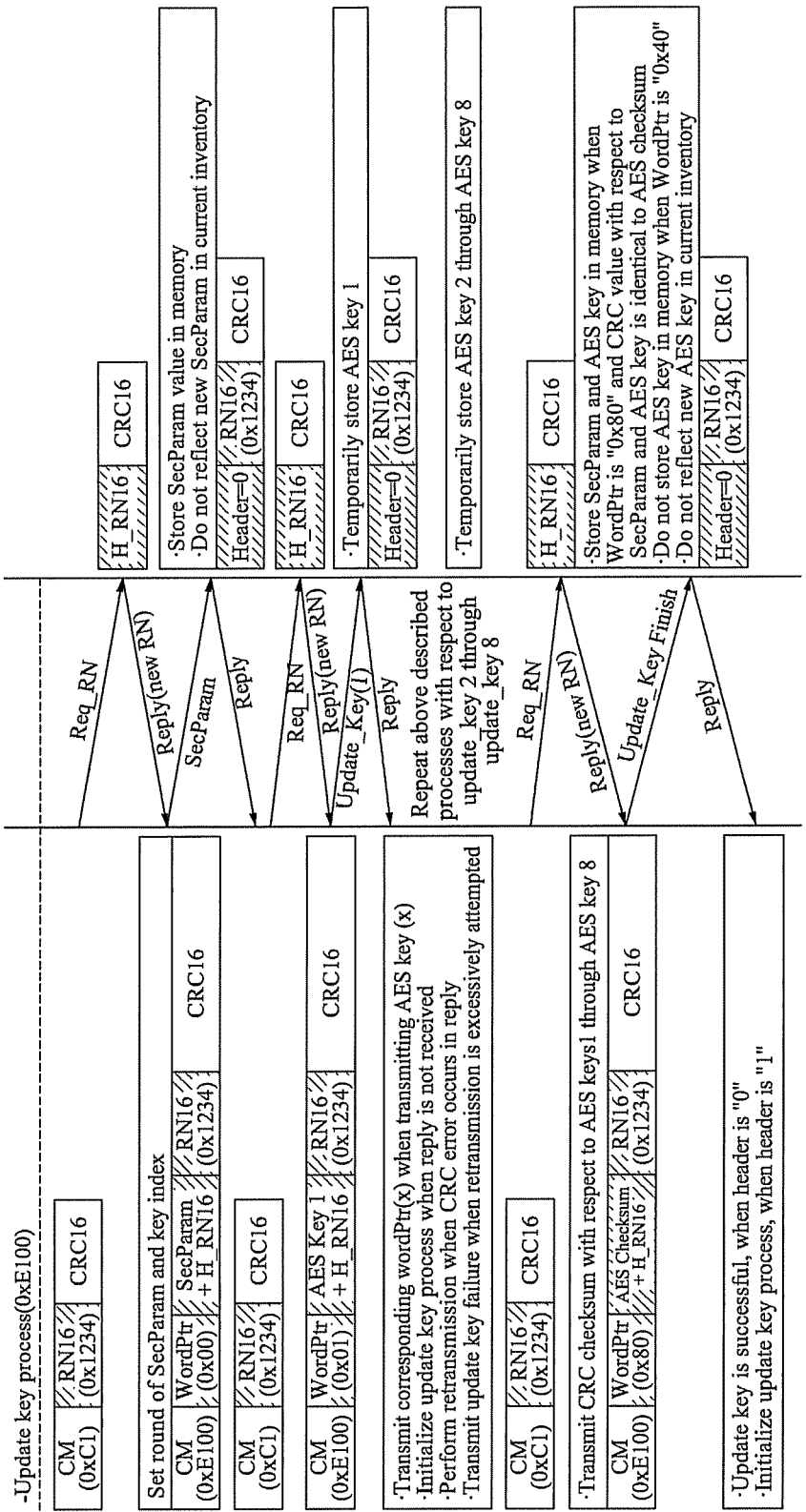
Figure 12C:
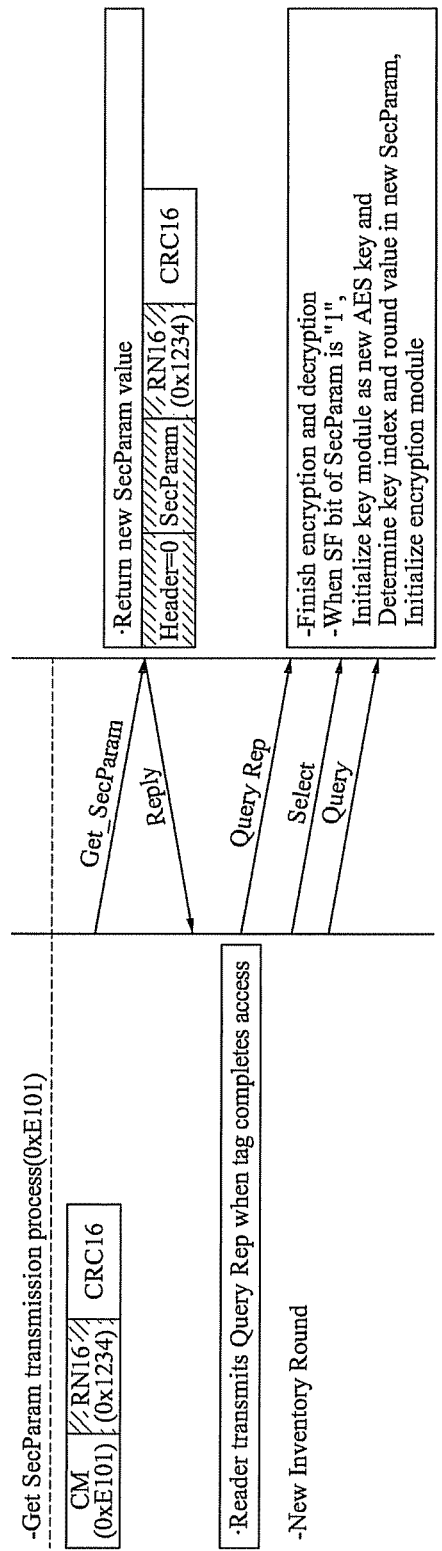

FIG. 10 is a flowchart illustrating an operational method of a secure tag reader of an RFID security apparatus having a security function according to example embodiments. Also, FIGS. 12A through 12C are flowcharts illustrating a communication procedure between a secure tag reader and a secure tag.

With reference to FIG. 10 and FIGS. 12A through 12C, first, the secure tag reader receives security information of the secure tag in operation S1001.

The secure tag reader determines an AES key using the security information when receiving the security information of the secure tag.

Here, the security information includes at least one of an SecXPC, an SecParam, and a Key_RN. In this instance, a secure tag of the SecXPC may be "1".

Subsequently, the secure tag reader generates an output key using the security information in operation S1003.

That is, the secure tag reader determines the AES key using an AES key index of the security information, and generates the output key using the security information and the AES key. Subsequently, the secure tag reader transmits an acknowledgement (ACK) with respect to the security information to the secure tag. In particular, the secure tag reader may generate the output key using the Key_RN (or a 128 bit input key or a 128 bit public key), a round number, and the like. In this instance, the secure tag reader may determine an AES key corresponding to the AES key index in a key database using an AES key index of the SecParam. Subsequently, the secure tag reader receives encrypted data and decrypts the encrypted data using the output key in operation S1005.

In particular, the secure tag reader receives the encrypted data and performs XOR with respect to the encrypted data and the output key to decrypt the encrypted data. During the decryption, decryption is not applied to a CRC and a command (CM) of data. Also, even after the decryption, decryption is not applied to the CRC and the command (CM) of data.

Subsequently, the secure tag reader transmits authentication command (Secure Req_RN command), and receives an authentication reply message (Secure Req_RN Reply message) as a response thereto, in operation S1007.

In particular, when the secure tag reader receives an SecPC, an SecXPC, and an SecParam from the secure tag at the time of mutual authentication that is performed when a session is started, and then when it is determined that an appropriate PC value and EPC value are received, the secure tag reader transmits the Secure Req_RN command of FIG. 4 to the secure tag to attempt mutual authentication. That is, the secure tag reader receives the SecPC, the SecXPC, and the SecParam, and when an SF bit value of the SecParam is "1", the secure tag reader attempts mutual authentication. The Secure Req_Rn command is performed only once for the mutual authentication when the session is started, and the secure tag is shifted into an open state after transmitting a Secure Req_RN reply message. Accordingly, operations of a Set SecParam, an update key, a write, and the like which are performed after performing the Secure Req_RN command uses a Req_RN.

That is, the secure tag reader transmits predetermined challenge data to the secure tag using the authentication command (Secure Req_RN command) message, and receives challenge reply data corresponding to the predetermined challenge data using the authentication reply (Secure Req_RN reply) message.

The secure tag reader transmits challenge data encrypted using encryption unit, and decrypts the challenge reply data using the decryption unit. That is, the secure tag reader performs XOR with respect to the certain challenge data and the output key to encrypt the certain challenge data. Also, the secure tag reader receives encrypted challenge reply data corresponding to the encrypted challenge data, and performs XOR with respect to the encrypted challenge reply data and the output key to decrypt the encrypted challenge reply data.

The secure tag reader compares the certain challenge data with the decrypted challenge reply data, and authenticates the secure tag. That is, the secure tag reader determines that the secure tag is not duplicated, when the certain challenge data is identical to the decrypted challenge reply data. Conversely, the secure tag reader determines that the secure tag is duplicated, when the certain challenge data is not identical to the decrypted challenge reply data.

Referring to FIG. 4, a code value of the Secure Req_RN command is "0xE102 (1110000100000010)". A challenge value of the Secure Req_RN command is a value that the secure tag reader randomly generates, and the value may be 16 bits, may not be limited thereto, and be variable. Also, the challenge value of the Secure Req_RN reply command may be a challenge value that the secure tag reader transmits to the secure tag.

When receiving secure Req-RN reply command message, the secure tag reader decrypts the received Secure Req_RN reply command message and determines whether the challenge value of the secure tag reader is received as a response value to authenticate the secure tag Accordingly, the RFID security apparatus according to example embodiments may prevent an attack and perform tag authentication.

Subsequently, when a key update is required, the secure tag reader transmits a key update command and receives a key update reply message in operation S1009.

That is, the secure tag reader generates a new AES key different from the existing AES key, and transmits a key update command including the new AES key.

In particular, the secure tag reader transmits an SecParam and an AES key (private key) to the secure tag using an update_key command message of FIG. 5. The secure tag reader may transmit, to the secure tag, an Req_RN command in advance, the Req_RN command requesting a challenge reply data for which XOR is performed with the AES key, in order to determine the AES key value is secure and appropriate before transmitting the update_key command message. Depending on a case, only the update_key command message may be transmitted. Subsequently, when receiving RN16, the secure tag reader transmits the AES key using the update_key command message.

Also, the secure tag reader transmits a security information request command of the secure tag and receives a security information reply message as a response thereto, in operation S1011.

In particular, the secure tag reader transmits a Get SecParam command message of FIG. 6, and receives a Get SecParam reply message, thereby determining whether a new SecParam is normally set in the secure tag. Also, the Get SecParam command and the Get SecParam reply message are illustrated in FIG. 6, and a code value of the Get SecParam command is "0xE101 (11100001 00000001)".

FIG. 11 is a flowchart illustrating an operational method of a secure tag of an RFID security apparatus having a security function according to example embodiments.

Referring to FIG. 11 and FIGS. 12A through 12C, a secure tag generates an output key using security information in operation S1101.

That is, the secure tag generates the output key using the security information and an AES key. Here, the security information includes at least one of an SecXPC, an SecParam, and a Key_RN, and the security information and the AES key are set in advance in a secure memory of the secure tag.

In particular, when receiving a select message from the secure tag reader, the secure tag generates a Key_RN (16 bits) for generating an input key (public key, 128 bits). The input key is generated in advance based on a process capability of the secure tag. In this instance, since the used tag is the secure tag, an SF bit of the SecParam is "1". The secure tag generates the input key (public key (128 bits)) using the Key_RN and generates the output key using the AES key and a round number which are stored in a memory together with the generated input key (public key). Here, the secure tag reader may freely adjust the round number according to power required for generating the output key and a reply time required for generating the output key.

Subsequently, the secure tag transmits the security information to the secure tag reader in operation S1103.

In particular, the secure tag receives a Query message or a Query Rep message from the secure tag reader, and when a slot counter of the secure tag is '0', the secure tag transmits an RN16 to the secure tag reader.

FIG. 13 is a diagram illustrating tag information of a general tag.

FIG. 14 is a diagram illustrating security information of a secure tag.

When receiving an ACK message with respect to the RN16 from the secure tag reader, a secure tag identifies an SecParam stored in the secure memory and transmits a reply message with respect to the ACK message. That is, when a SF bit value of the SecParam is "0" the secure tag transmits a reply message of FIG. 13 according to ISO/IEC 18000-6 protocol specification, namely the tag information, and when the SF bit value of the SecParam is "1", the secure tag transmits a reply message of FIG. 14, namely the security information. Here, the reply message of FIG. 14 is transmitted in a state of being not encrypted.

Referring to FIG. 13 and FIG. 14, PC and XPC of FIG. 13 have a same configuration as SecPC and SecXPC of FIG. 14. Accordingly, the SecPC is constituted by $00010_2$ indicating three words in first 5 bits (word length), a UMI of 1 bit, XI of 1 bit, and NSI of 9 bits. Also, when a SP bit of the SecXPC is "1", it indicates that a corresponding message is a reply with respect to the ACK command of the secure tag, namely, SecPC, SecXPC, SecParam, Key_RN (or 128 bits input key), and when the SP bit of the SecXPC is "0", it indicates that the corresponding message is a reply with respect to an ACK command of a general tag, namely PC, XPC, and EPC (UII). A CRC-16 value of the security reply message of FIG. 14 is required to be a newly generated CRC-16 value as opposed to being a CRC-16 value that is stored in advanced in the secure memory.

Subsequently, the secure tag encrypts data using an output key and decrypts encrypted data in operation S1105.

In particular, the secure tag performs XOR with respect to the data and the output key to encrypt the data, and transmits the encrypted data to the secure tag reader. Also, the secure tag performs XOR with respect to the encrypted data received from the secure tag reader and the output key to decrypt the encrypted data.

Subsequently, when receiving an authentication command (Secure Req_RN command message), the secure tag transmits an authentication reply (Secure Req_RN reply) message as a response thereto in operation S1107.

That is, when receiving encrypted challenge data through the Security Req_RN command message, the secure tag transmits an encrypted challenge reply message corresponding to the encrypted challenge data through the Secure Req_RN reply message to the secure tag reader.

In particular, the secure tag performs XOR with respect to the encrypted challenge data and the output key to decrypt the encrypted challenge data. Subsequently, the secure tag performs XOR with respect to the decrypted challenge data and the output key to re-encrypt the decrypted challenge data, thereby generating the challenge reply data.

Subsequently, when receiving a key update command, the secure tag transmits a key update reply message as a response thereto in operation S1109.

That is, when the secure tag receives a new AES key, the secure tag stores the new AES key in the secure memory.

In particular, when the secure tag receives, from the secure tag reader, a message requesting an Req_RN, the secure tag transmits an RN16 to the secure tag reader. Subsequently, the secure tag receives, from the secure tag reader, an AES key to be updated, using an update key command message, and transmits an update_key reply message corresponding thereto to the secure tag reader. In this instance, the secure tag receives the AES key that is to be updated, and stores the AES key based on a final CRC check. Here, the updated AES key is not reflected in a current inventory.

Subsequently, when receiving a security information request command of the secure tag, the secure tag transmits a security information reply message as a response thereto, in operation S1111.

That is, when receiving a Get SecParam command message from the secure tag reader, the secure tag may transmit a newly set SecParam to the secure tag reader using the Get SecParam reply message.

Figure 15A:
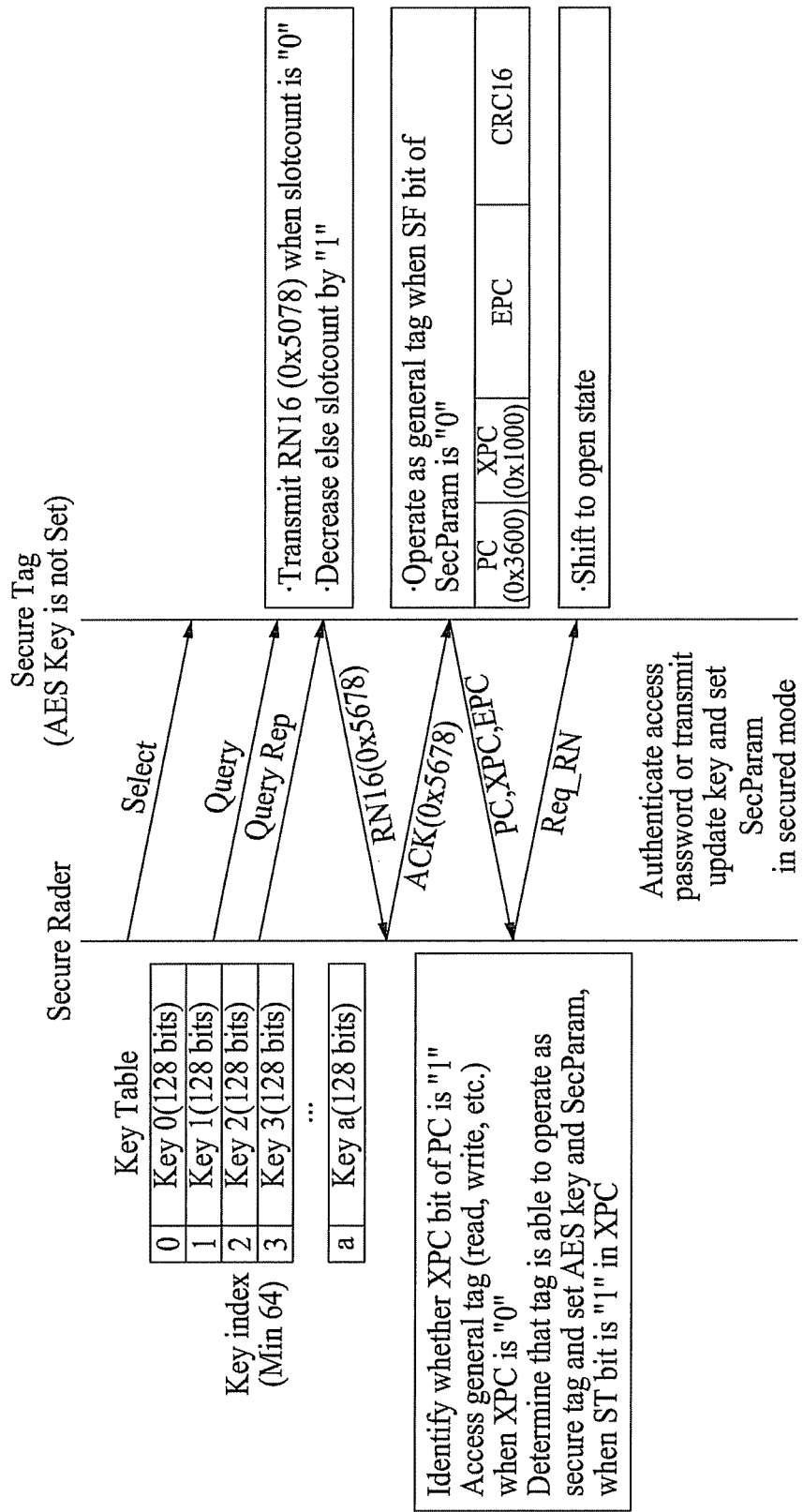
FIGS. 15A, 15B and 15C are flowcharts illustrating a communication procedure between a secure tag reader and a secure tag where an advanced encryption standard (AES) key is not set in the RFID security apparatus.
Figure 15B:
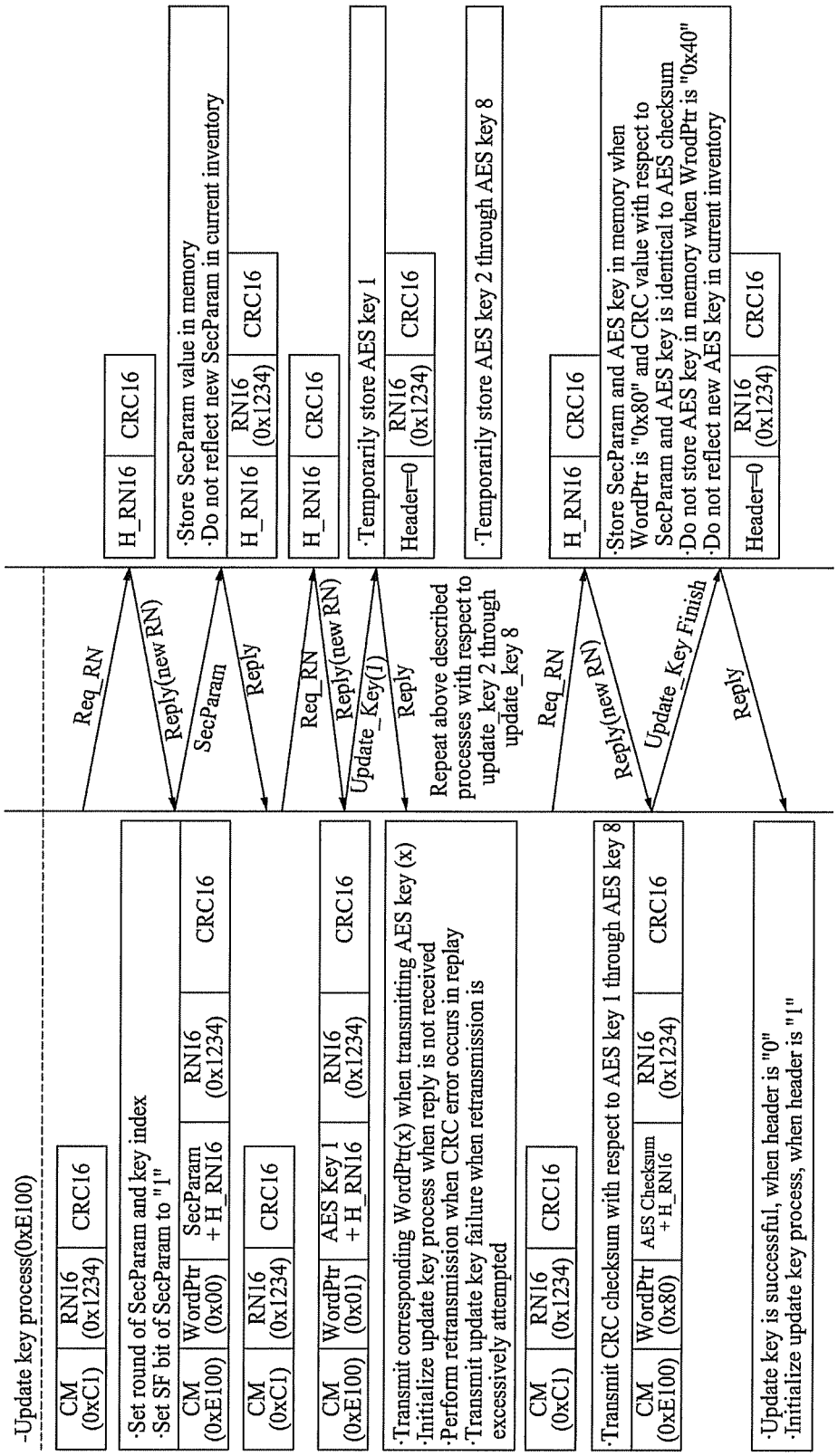
Figure 15C:
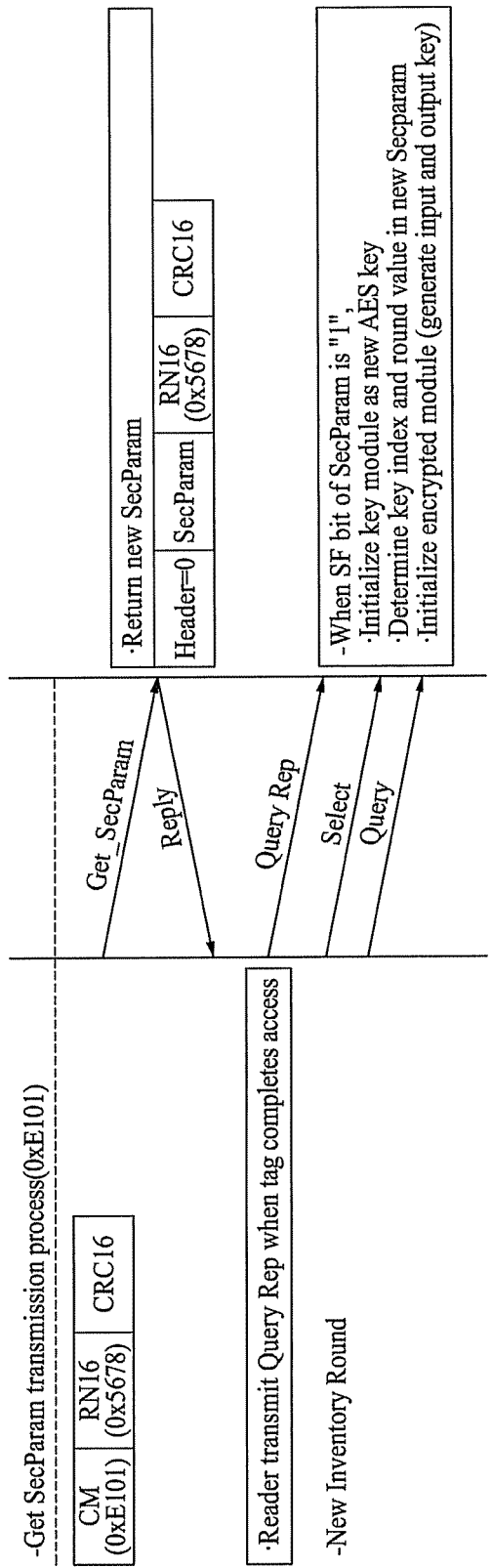

FIGS. 15A through 15C are flowcharts illustrating a communication procedure between a secure tag reader and a secure tag where an advanced encryption standard (AES) key is not set in the RFID security apparatus.

Referring to FIGS. 15A through 15C, the secure tag reader transmits an ACK message with respect to an RN16.

When the secure tag receives the ACK message with respect to the RN16, the secure tag transmits a PC, an XPC, and an EPC to the secure tag reader.

Subsequently, the secure tag reader receives the PC, the XPC, and the EPC. When a secure tag bit in the XPC is "1", the secure tag reader determines whether a tag is able to be used as the secure tag. When the secure tag bit in the XPC is "1", that is, when the tag is able to be used as the secure tag, the secure tag reader updates the AES key and identifies the SecParam. Subsequently, the update key and the Get SecParam are transmitted in a same manner as a transmission method of the update key and the Get SecParam of FIGS. 12b and 12c.

However, when transmission of the update key and the Get SecParam is performed in an RFID security apparatus where the AES key is not set, a message used in the communication is not encrypted, and thus, the message is not encrypted or decrypted.

The RFID security apparatus and method having security function according to example embodiments encrypts data using security information, thereby supporting data security. Accordingly, stability increases when the RFID security apparatus is utilized.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. A radio frequency identification (RFID) security apparatus, the apparatus comprising:
    an output key generator disposed in an RFID secure tag to receive security information generated in advance based on a process capability of the RFID secure tag, to determine an advanced encryption standard (AES) key using the security information, and to generate an output key using the determined AES key; and
    an encryption unit using the output key to encrypt transmission data transmitted to the RFID secure tag, and a decryption unit to decrypt encrypted reception data received from the RFID secure tag.

2. The apparatus of claim 1, wherein the encryption unit perform exclusive OR (XOR) with respect to the transmission data and the output key, and the decryption unit perform XOR with respect to the reception data and the output key.

3. The apparatus of claim 1, further comprising:
    a tag authentication unit to authenticate the RFID secure tag,
    wherein the encryption unit encrypts a predetermined length of challenge data using the output key and transmits the encrypted challenge data to the RFID secure tag, the decryption unit receives encrypted challenge reply data corresponding to the encrypted challenge data from the RFID secure tag and decrypts the encrypted challenge reply data using the output key, and the tag authentication unit compares the predetermined length of challenge data and the decrypted challenge reply data to authenticate the RFID secure tag.

4. The apparatus of claim 1, wherein the output key generator recognizes whether data subsequent to extended protocol (XPC) is the security information used for encrypting using a predetermined bit of the XPC received from the RFID secure tag.

5. The apparatus of claim 1, wherein the output key generator generates the output key using a round number included in the security information, the round number being adjusted according to power required for generating the output key and a reply time required for generating the output key.

6. The apparatus of claim 1, wherein the encryption unit encrypts data and the decryption unit decrypts data, excluding a command and a cyclic redundancy check (CRC) with respect to the reception data and the transmission data.

7. An RFID security apparatus, the apparatus comprising:
  an output key generator disposed in an RFID secure tag to generate an output key using an AES key determined using security information received from the RFID secure tag, wherein the security information is based on a process capability of the RFID secure tag; and
  an encryption unit to encrypt data transmitted to a secure tag reader using the output key, and a decryption unit to decrypt data received from the secure tag reader.

8. The apparatus of claim 7, further comprising:
  a key updating unit to store, in a secure memory, a new AES key different from the AES key,
  wherein the key updating unit receives a plurality of packets including parts of the new AES key from the secure tag reader, and stores the new AES key in the secure memory when a value obtained by performing CRCs respectively included in the packets and a CRC checksum with respect to the new AES key received from the secure tag reader are identical.

9. The apparatus of claim 7, wherein either the encryption unit or the decryption unit decrypts encrypted challenge data received from the secure tag reader using the output key, re-encrypts the decrypted challenge data using the output key to generate an encrypted challenge reply data that transmits the re-encrypted challenge data to the secure tag reader.

10. An RFID security method, comprising:
  determining an AES key using security information received from an RFID secure tag and generating an output key using the determined AES key;
  decrypting AES data received from the RFID secure tag using the output key; and
  encrypting data to be transmitted to the RFID secure tag using the output key and transmitting the data,
  wherein the security information is based on a process capability of the RFID secure tag.

11. An RFID security method, comprising:
  generating an output key in an RFID secure tag using an AES key and security information, and transmitting the security information to a secure tag reader;
  encrypting data to be transmitted to the secure tag reader using the output key, and transmitting the encrypted data to the secure tag reader; and
  decrypting data received from the secure tag reader using the output key,
  wherein the AES key is determined using the security information and the security information is based on a process capability of the RFID secure tag.

* * * * *